Feb. 25, 1941.  J. AITKEN  2,233,302
PROCESS FOR THE MANUFACTURE OF OXIDES OR SUBOXIDES OF LEAD
Filed July 12, 1937
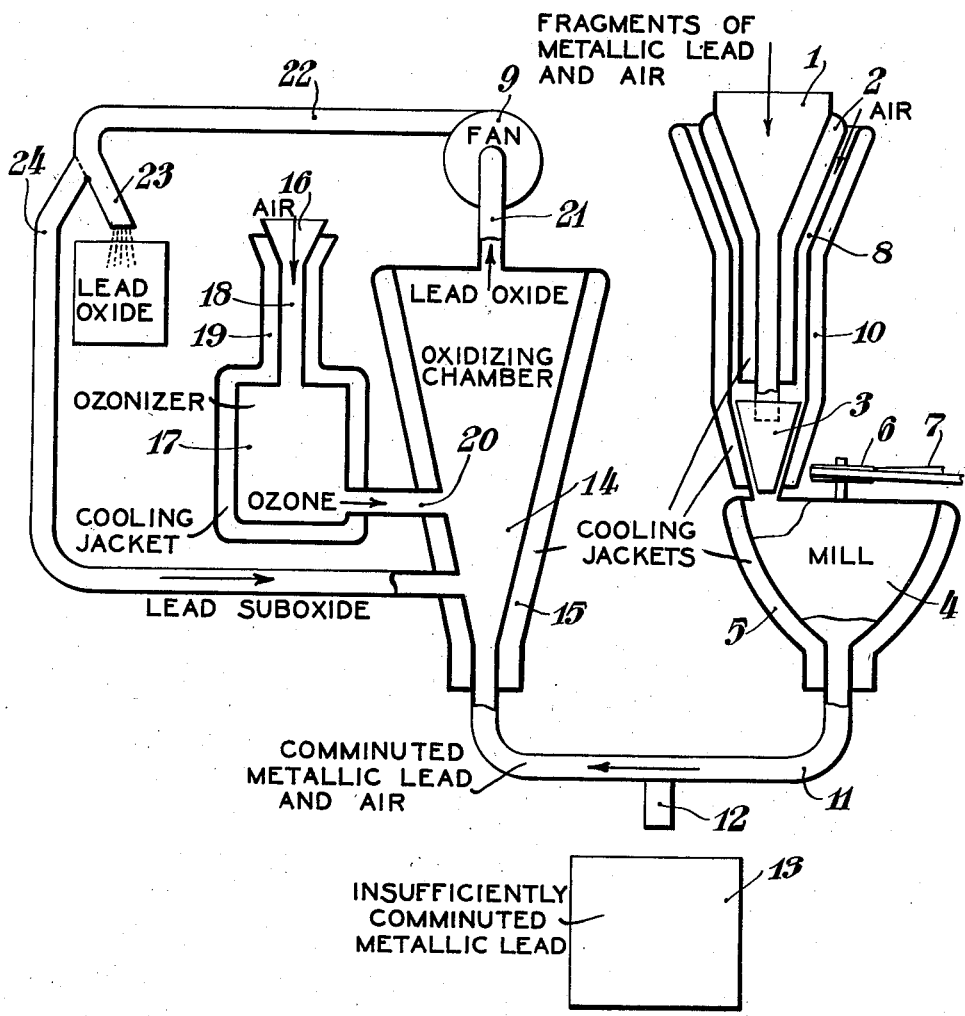
INVENTOR:
JAMES AITKEN
BY: Francis E. Boyce
ATTORNEY Patented Feb. 25, 1941

2,233,302

UNITED STATES PATENT OFFICE 2,233,302

PROCESS FOR THE MANUFACTURE OF OXIDES OR SUBOXIDES OF LEAD

James Aitken, Highfield, Southampton, England

Application July 12, 1937, Serial No. 153,164
In Great Britain July 13, 1936

13 Claims. (Cl. 23—146)

This invention relates to processes for the manufacture of oxides or suboxides of lead, of the type in which metallic lead is reduced to an extremely fine state of division, and the air-borne fine lead powder is oxidised by means of a gaseous oxidising agent.

The invention has for its object an improved process, of the type referred to, for the manufacture of oxides or suboxides of lead.

While it has already been proposed to use ozone as an oxidising agent, the use of ozone has not been adopted idustrially, probably owing to the inefficiency of the ozone generators that were available, and to the corrosive action of the ozone on metals.

Moreover, in processes in use hitherto, making use of various gaseous oxidising agents, an increase in the rate of oxidation has been sought by means of an increase of temperature, the heat being derived either from an external source or from the reaction itself, or from the friction in the attrition mills used for reducing the metal to be oxidised to a very fine powder.

I have found that greatly improved results are obtained, consisting in a great efficiency of the process and a homogeneous oxide or suboxide of lead of uniform grade, when the temperatures at which the operations of comminution and oxidation are carried out are kept low by suitable cooling means, so that this temperature is below 60° C., in spite of the heat generated by the comminution and the oxidation and preferably much lower.

According to my invention, I provide an industrial process for the manufacture of lead suboxide and higher oxides of lead, from metallic lead and lead-suboxide, respectively, characterised in that the temperature of the metallic lead is maintained below 60° C. in spite of the heat generated by the comminution, so that it is in a non-plastic condition, before and/or while being comminuted in atmospheric air to a state of such extremely fine division as to be air-borne, and is then exposed to an oxidising agent consisting in a mixture of air and ozone in controllable proportions, at a temperature below 60° C.

This may be carried out by keeping down the temperature of the lead being comminuted, (e. g. by preliminarily cooling the lead being fed into the attrition mill) or by cooling the air entering the attrition mill or the attrition mill itself, or by more than one of these methods used together; it may be assisted by keeping down the temperature of the oxidising agent (e. g. by cooling the air supplied to the ozoniser) or by cooling the chamber in which the oxidation takes place. It has been found that very satisfactory results are obtained when the temperature of the material to be or being oxidised is kept much below 60° C.

The greater efficiency of the process and the higher quality and superior grade of the products obtained is due to two factors which contribute to this result. The first factor is a mechanical one: by cooling the lead, this metal, which becomes malleable at a quite moderate temperature, is kept non-plastic, and it is then in the best possible condition for being reduced to a perfectly uniform and homogeneous powder, while the mill in which it is comminuted does not get clogged by partially softened lead. The second factor is a chemical one: by cooling the air entering the ozoniser, the quantity of air per unit volume is relatively considerably increased, the result being an increased efficiency of the ozoniser and a higher rate of production of ozone, as well as a higher proportion of ozone to air in the mixture issuing from the ozoniser, resulting in a higher rate of oxidation. Moreover, by sufficiently cooling the material being comminuted, whether metallic lead or suboxide of lead, oxidation may be minimised or prevented, while this material is in the mill, in which only atmospheric air is admitted, until the material has reached the desired degree of fineness, when it is admitted to the oxidising chamber, thereby securing a product which is more homogeneous than hitherto obtained, both as to the uniformity of size of the grains of powder and as to the degree of oxidation.

By "air-borne," I mean that the powder is so fine that, having been suspended in air, it will remain some time in suspension in the still air and settle but very slowly; in this condition, a stream of air having but a moderate velocity will lift it from a horizontal surface on which it forms a layer, to form a suspension and be transported by the air.

By "ozone," I mean the allotrope of oxygen, $O_3$, this being, of course, always obtained in the form of a mixture of air and of this allotrope, as it issues from an ozoniser, owing to the manner in which ozone is produced.

Other gases may be present in small quantities.

The use of ozone as an oxidising agent allows of controlling the rate of oxidation by varying the proportion of the air in the mixture air-ozone issuing from the ozoniser. The temperature of the oxidising atmosphere may also be conveniently controlled by controlling the temperature of the air admitted in the ozoniser, or of the oxidising chamber.

The material, whether metallic lead or a suboxide of lead, is, before being exposed to the action of the oxidizing agent, first mechanically comminuted in atmospheric air, by attrition, impact or other suitable like method, to an extremely minute state of division, (e. g. so as to pass through a sieve of 300 mesh to the inch, or finer). With such a degree of fineness, the powder is airborne and a stream of air or of the gaseous oxidising agent, of moderate velocity, provides an effective manner of transporting the powdered material from one part of the plant to another. The material fed into the attrition mill may be preliminarily cooled, e. g. by being stored in a refrigerator, or the mill itself is cooled, by any suitable means, such as a brine jacket, so that the temperature of the material while being comminuted is below 60° C.

As it has been stated, the activity of a mixture of air and ozone, as an oxidising agent, is greater at low temperature, owing to the greater concentration of ozone; the air entering the ozone generator is therefore cooled (and also, if desired, dried) before passing over the ozone generating elements and the oxidising atmosphere formed is brought in contact with the air-borne powder of lead or lead suboxide to be oxidised in an oxidising chamber which may be provided with cooling means.

The process is therefore essentially a low temperature process, the temperature at any point remaining below 60° C.

The rate of oxidation is a function of several factors, each of which is capable of being easily controlled, namely:

1. The degree of fineness or extent of the surface area of the substance subjected to the oxidising process;
2. The temperature and humidity of the atmosphere and the temperature of the substance subjected to the oxidising process;
3. The proportion of ozone to air;
4. The proportion of ozone atmosphere of a particular concentration to the quantity of finely divided substance.

It follows, therefore, that, for a given degree of division of the substance being oxidised, the degree of oxidation is capable of being controlled by varying either the concentration or the temperature of the ozone atmosphere, the temperature of the substance in a finely divided state, the proportion of the quantity of the substance to the quantity of the ozone atmosphere, or the duration of the treatment.

The process may of course be carried out to oxidise metallic lead, either partly or wholly, or lead which has been partly oxidised initially, either naturally or by means of any other known process, for the purpose of bringing the said oxidised lead to a higher and more uniform degree of oxidation. Only an initial, or both an initial and a final (or any intermediate stage of) oxidation may be carried out by the treatment.

Cold air may be admitted at any suitable point and/or at any desired stage of the process to cool the material being oxidised or to prevent further oxidation of the partly oxidised material.

The fan causes a reduced pressure in the whole apparatus, so that the oxidtaion takes place at a pressure below atmospheric pressure. The difference between the pressure inside the apparatus and the atmospheric pressure may be adjusted as may be desired by regulating the speed of the fan and the amount of air admitted into the apparatus, either at the mill or at the ozoniser or at other places, thereby providing an additional regulating means.

The attrition mill used for comminuting the material to be oxidised may be of a type that creates a suction and assists the action of the fan.

Referring to the drawing left herewith, which illustrates, as an example only, apparatus adapted for carrying out the process, according to the invention:

The figure is a diagrammatic representation or "flow sheet" of an apparatus suitable for a single stage process;

In the apparatus shown, small pieces of metallic lead or of lead suboxide from a storage container, 1, which may be cooled by a cooling jacket 2, are fed through a shaker feed 3 into the fixed casing 4 of an attrition mill of suitable design, surrounded by a cooling jacket 5 and driven by means of a pulley 6 and a belt 7, in which mill it is reduced to an extremely fine state of fineness. Air is sucked in at 8 by the action of the mill and by a fan 9, or some like device, and is cooled by the jacket 2 and an additional jacket 10. The finely powdered material falls at the bottom of the casing 4 and is carried off by the stream of air passing through the apparatus by the fan 9, through a pipe 11; the air-borne powder travelling along the pipe 11 passes over a separator 12, only the very finest particles escaping from this separator and being carried along by the air stream into an oxidising chamber 14, surrounded by a cooling jacket 15, while the particles which have not reached the required grade of fineness fall into the separator pipe 12 and thence into a container 13, whence they are returned to the mill by any suitable conveying mechanism (not shown) and circulate through the comminuting system until they have attained the requisite degree of fineness.

Air is sucked in at 16 by the fan 9, into an ozoniser 17, through a pipe 18 provided with a cooling jacket 19, and the ozone formed is drawn along the pipe 20 into the oxidising chamber 14, where the suspended particles of metallic lead or lead sub-oxide are oxidised by the ozone of the oxidising atmosphere in the chamber 14, and escape by the pipe 21, the fan 9 and the delivery pipe 22 to the outlet 23. The particles passing along the pipe 22 may be diverted if desired by a pipe 24 and sent back to the oxidising chamber 14, or some other such chamber, for further oxidation.

Whenever found desirable, baffles of any suitable shape may be used, either singly or in any suitable arrangement, to direct the flow of the ozonised atmosphere.

The plant can be made in self-contained units and additional units added as increased output is required.

In the preferred manner of carrying out the invention, the oxidising is carried out in a single stage; it may however be carried out in more than one stage, and it is not limited in the number of stages of oxidation that can be performed, as the particles may circulate repeatedly through the same stage or through two or three of the stages or any combination of them, one or more times, until the desired degree of comminution and oxidation is obtained.

The process for manufacturing these oxides or suboxides of lead, according to the invention, is simple and automatic in operation; it is adapted to yield, with a minimum of attention, products which are homogeneous in their physical properties, within fine limits. A single stage only of the process is generally necessary in order to obtain the suboxides or oxides of lead required for usual industrial purposes.

It will be understood that modification of detail may be made to the process and apparatus described above, without departing from the broad principle defined in the statement of claim.

What I claim is:

1. A process for the manufacture of lead suboxide and higher oxides of lead from metallic lead, comprising the step of exposing lead in a state of fine division to the oxidising action of a mixture of air and ozone at a temperature below 60° C.

2. A process for the manufacture of lead suboxide and higher oxides of lead from metallic lead, comprising the step of comminuting the lead to a state of such extremely fine division that it passes through a sieve of 300 mesh to the inch, while maintaining its temperature below 60° C. so that it is in a non-plastic condition while being comminuted and subsequently submitting it to the oxidising action of a mixture of air and ozone.

3. A process for the manufacture of lead suboxide and higher oxides of lead from metallic lead, comprising the steps of comminuting the lead to a state of such extremely fine division that it passes through a sieve of 300 mesh to the inch, while maintaining its temperature below 60° C. so that it is in a non-plastic condition while being comminuted, and of exposing the lead to the oxidising action of a mixture of air and ozone in an oxidising chamber at a temperature below 60° C.

4. A process for the manufacture of lead suboxide and higher oxides of lead from metallic lead, comprising the step of maintaining metallic lead in a state of fine division in an atmosphere of air at a temperature below 60° C. to prevent oxidation and then exposing the said metallic lead to the oxidising action of a mixture of air and ozone at a temperature below 60° C.

5. A process for the manufacture of lead suboxide and higher oxides of lead from metallic lead, comprising the step of comminuting the lead to a state of such extremely fine division that it passes through a sieve of 300 mesh to the inch, while maintaining its temperature below 60° C. so that its condition corresponds to that portion of the graph representing the variation of hardness of lead with temperature where the rate of increase of hardness with falling temperature is the most rapid, and subsequently submitting it to the oxidising action of a mixture of air and ozone.

6. A process for the manufacture of lead suboxide and higher oxides of lead, as claimed in claim 3, in which the temperature of the lead is maintained below 60° C. while it is being comminuted, by drawing a stream of cold air through the mill.

7. A process for the manufacture of lead suboxide and higher oxides of lead, as claimed in claim 3, in which the temperature of the attrition mill is maintained below 60° C.

8. A process for the manufacture of lead suboxide and higher oxides of lead, as claimed in claim 3, in which a stream of cooled air, produced by means of a suitable fan, is used to maintain the comminuted lead to a temperature below 60° C. while transporting it from the mill into the oxidation chamber.

9. A process for the manufacture of lead suboxide and higher oxides of lead, as claimed in claim 3, in which the oxidising chamber is maintained at a temperature below 60° C.

10. A process for the manufacture of lead suboxide and higher oxides of lead, as claimed in claim 3, in which cooled air is admitted to a generator of ozone, the mixture of air and ozone being thereby maintained at a temperature below 60° C. before being conducted to the oxidising chamber in spite of the heat generated by the ozonising electric discharge.

11. A process for the manufacture of lead suboxide and higher oxides of lead, as claimed in claim 3, comprising the step of increasing the rate of oxidation of the product by lowering the temperature of the ozonised atmosphere.

12. A process for the manufacture of lead suboxide and higher oxides of lead, as claimed in claim 3, in which the medium in the oxidation chamber is below the atmospheric pressure.

13. A process for the manufacture of lead suboxide and higher oxides of lead, as claimed in claim 3, in which the air and oxidising agent in the oxidising chamber is sucked in by means of a fan.

JAMES AITKEN.